Jan. 17, 1928.

H. B. SHIELDS 1,656,397

TRANSMISSION

Filed March 23, 1926   2 Sheets-Sheet 1

Inventor
HENRY B. SHIELDS

By his Attorneys
Redding, Greeley, O'Shea & Campbell

Jan. 17, 1928.  
H. B. SHIELDS  
1,656,397  
TRANSMISSION  
Filed March 23, 1926  
2 Sheets-Sheet 2
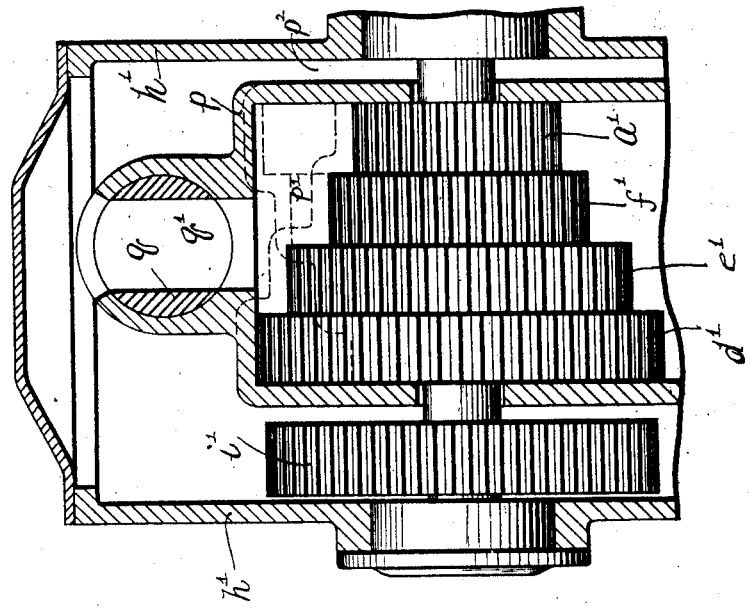
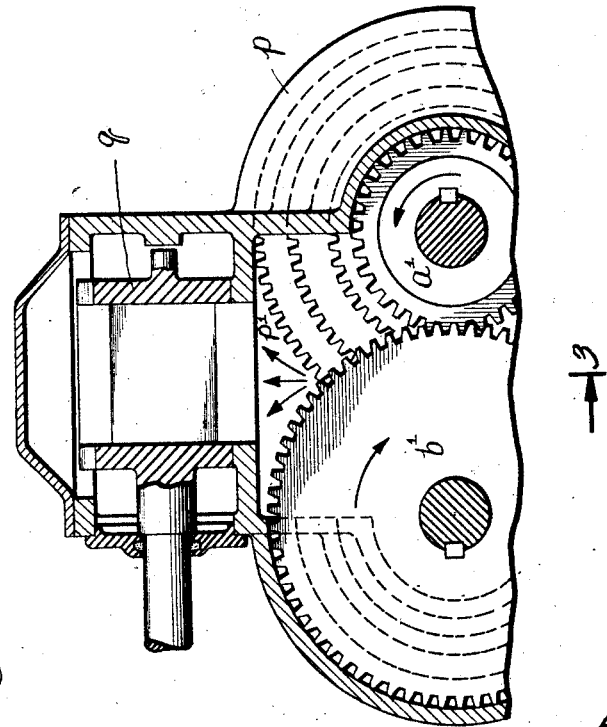
Inventor  
HENRY B. SHIELDS  
By his Attorneys  
Redding, Greeley, O'Shea & Campbell Patented Jan. 17, 1928.

1,656,397

UNITED STATES PATENT OFFICE.

HENRY B. SHIELDS, OF FREEPORT, NEW YORK, ASSIGNOR TO INTERNATIONAL MOTOR COMPANY, OF NEW YORK, N. Y., A CORPORATION OF DELAWARE.

TRANSMISSION.

Application filed March 23, 1926. Serial No. 96,677.

This invention relates to transmission or change speed mechanisms for self-propelled vehicles and has for its object a structure wherein the difficulties attending the shifting of gears in the attainment of different speeds is avoided. In the device according to the invention the cooperating gears affording the different gear ratios are carried respectively upon a jack shaft and a driven shaft journaled in a suitable transmission housing, as is customary, but instead of the gears of one set being slidably mounted upon one of the shafts for movement into and out of engagement with the co-operating gears upon the other shaft, the respective pairs of gears are always in mesh and the gears upon one shaft, for instance, the driven shaft are carried upon a series of concentric sleeves, the selective rotation of the respective sleeves being effected from the driving shaft through the instrumentality of clutching mechanism of improved and simplified design. The invention also seeks to provide for the braking or retardation of the propeller shaft by the utilization of the constantly meshing gears as a plurality of fluid pumps so that a resistance to the flow of fluid on the outlet side of such pumps will effect a retardation of the rotation of the gearing and thus retard the propeller shaft and brake the vehicle. The invention also has to do with a simplification of the structure as a whole in the interest of manufacture, assembly and use. These and other objects of the invention and the means for their attainment will be more apparent from the following detailed description of the accompanying drawings illustrating a preferred embodiment of the invention in which:

Figure 2 is a view taken in the plane indicated by the line 2—2 in Figure 1 and looking in the direction of the arrows and showing the utilization of the enmeshing gears as fluid pumps for the purpose of effecting a retardation of the rotation thereof to brake the vehicle.

Figure 3 is a longitudinal sectional view taken in the plane indicated by the line 3—3 in Figure 2 and looking in the direction of the arrows.

Figure 1:
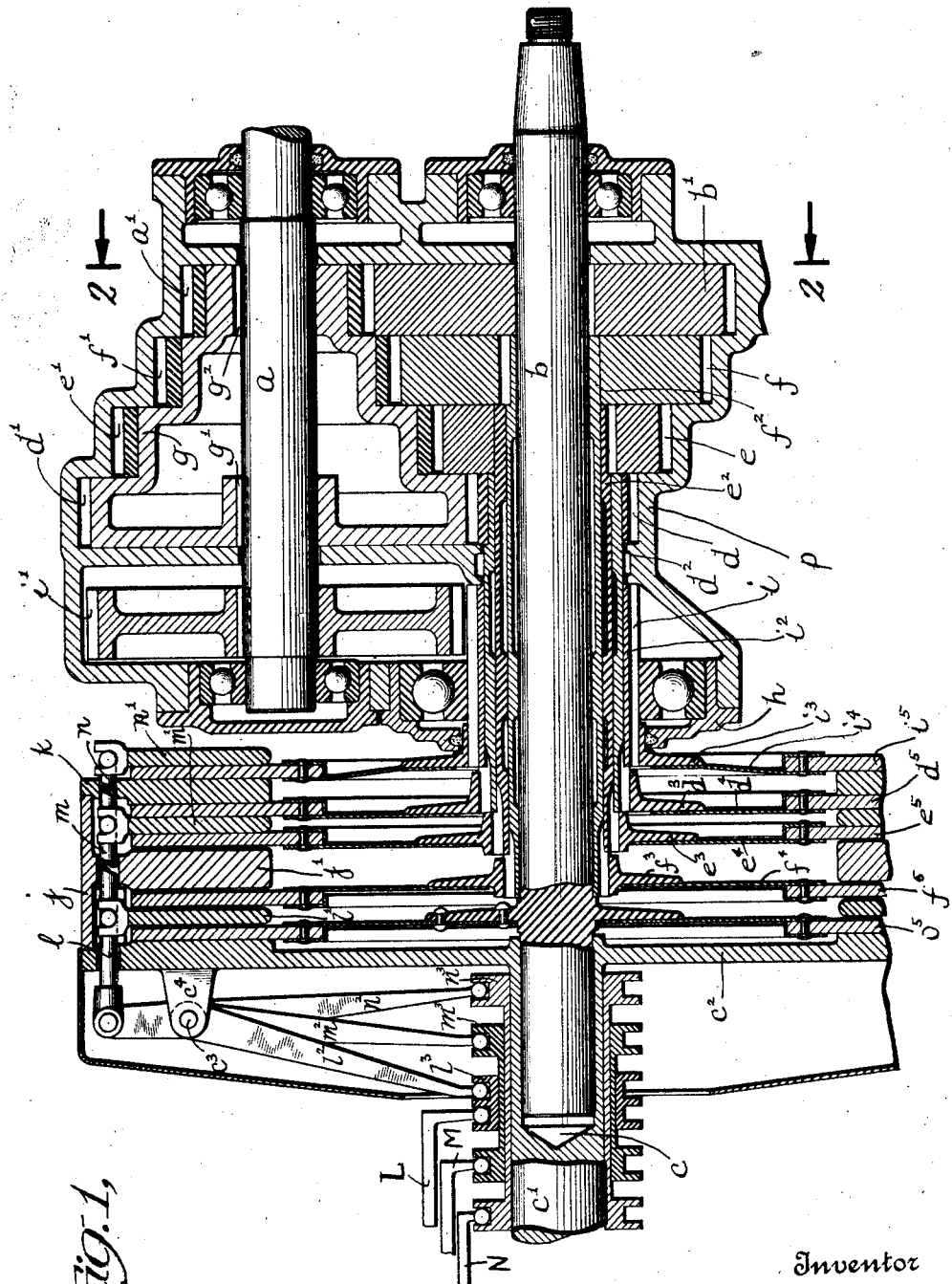
Figure 1 is a longitudinal sectional view showing the change speed mechanism disposed within a transmission housing and the clutching devices whereby the various gear ratios are rendered effective.

Referring first to Figure 1 the change speed mechanism is illustrated as including a jack shaft $a$ and a driven shaft $b$ which is journaled in a recessed end $c$ of a shaft $c'$ rotated by the prime mover. The propeller shaft is, of course, operatively connected, preferably by a universal joint, with the right-hand end as viewed in Figure 1 of the driven shaft $b$. The drive is effected in general from the driving shaft $c'$ through a suitably proportioned pair of gears to the jack shaft $a$ and from the jack shaft by another suitably proportioned pair of gears including the gear $b'$ to the driven shaft $b$. It is proposed to afford three different speeds in a forward direction as well as a direct drive and a reverse drive by the transmission according to the present invention. To this end three gears of different diameters $d$, $e$ and $f$, respectively, are illustrated as carried with the driven shaft $b$ and as meshing with the respective gears $d'$, $e'$ and $f'$ on the jack shaft. Gears $d'$, $e'$, $f'$ and a gear $a'$ meshing with the gear $b'$, are keyed to the jack shaft $a$. Preferably, these gears are formed on a unitary carrier member $g$ keyed as at $g'$, $g^2$ to the jack shaft $a$. Each of the gears $d$, $e$ and $f$ are carried upon respective concentric sleeves $d^2$, $e^2$ and $f^2$ surrounding shaft $b$ and these sleeves are of such length as to extend outwardly beyond the front wall $h$ of the transmission housing for selective engagement with the driving shaft $c'$.

The reverse drive is effected by a gear $i$ on the shaft $b$ rotating gear $i'$ on jack shaft $a$ through the instrumentality of another gear, not shown, in the usual manner. Gear $i$ is also carried upon a concentric sleeve $i^2$ extending without the housing. The outer extremities of the concentric sleeves are splined and fit splines in the flanges, $i^3$, $d^3$, $e^3$ and $f^3$, respectively, and to these flanges are secured discs, $i^4$, $d^4$, $e^4$, $f^4$, respectively, carrying clutching discs $i^5$, $d^5$, $e^5$ and $f^5$ whereby the drive at a given speed is attained in the following manner. When a predetermined speed is desired, the required gear ratio is effected by causing the respective sleeve to rotate in synchronism with driving shaft $c'$. In the illustrated embodiment this is effected by selective clutching mechanism comprising a flange $c^2$ formed on the end of driving shaft $c$ and carrying a cylindrical or annular element $j$, having an inwardly extending flange $j'$ centrally thereof and carrying at its outer edge an inwardly extending flange $k$. Journaled in the flanges $c^2$, $j'$ and $k$ are a series of rods $l$, $m$ and $n$ which have supported thereon in suitable fashion friction discs $l'$, $m'$ and $n'$. Rods $l$, $m$ and $n$ are respectively connected to levers $l^2$, $m^2$ and $n^2$ fulcrumed as at $c^3$ upon the bracket $c^4$ so that through the instrumentality of one of the levers movement of the rod will bring one of the friction discs $l'$, $m'$ and $n'$ into engagement with one of the adjacent friction discs $f^5$, $e^5$, $d^5$, $i^5$ or $o^5$ as the case may be, the friction disc $o^5$ being carried upon shaft $b$ whereby direct drive may be effected. Thus one of the aforesaid discs may be frictionally retained in contact with flange $c^2$ or its associated parts whereby the friction discs and the corresponding concentric sleeve may be caused to rotate in unison. The actuating mechanism for the levers $l^2$, $m^2$ and $n^2$ may take any desired form. In the illustrated embodiment a plurality of concentric sleeves $l^3$, $m^3$ and $n^3$, are disposed upon the end of shaft $c'$ and are formed with sockets to receive the end of the levers and with other sockets to receive the end of actuating fingers L, M and N. The clutching discs $l'$, $m'$ and $n'$ are each provided with not less than 3 rods $l$, $m$ and $n$ and three levers $l^2$, $m^2$ and $n^2$, making nine rods and nine levers evenly spaced about the face of the flange $e^2$. This is to insure an even distribution of pressure to the discs $l'$, $m'$ and $n'$.

Assuming that it is desired to effect a direct drive between the driving shaft $c'$ and the driven shaft $b$ lever L will be moved to the right as viewed in Figure 1 thereby moving concentric sleeve $l^3$ in that direction and effecting movement of the lever $l^2$ about the fulcrum $c^3$ to cause movement of the rod $l$ to the left carrying with it the disc $l'$ and clamping the disc $o^5$ firmly against the flange $c^2$. Disc $o^5$ is thus frictionally engaged between the adjacent faces of flanges $c^2$ and disc $l'$ and the two shafts $c'$ and $b$ are caused to rotate in unison.

If it is desired that shaft $b$ rotate at a speed of rotation different from that of shaft $c'$ this is accomplished by driving through one of the pairs of gears $d$, $e$ or $f$. To this end one of the fingers, say M, is moved to the left moving sleeve $m^3$ in that direction and causing the movement of the lever $m^2$ about its fulcrum to cause movement of rod $m$ to the right thereby clamping in frictional engagement the disc $d^5$ between discs $m'$ and $k$. Disc $d^5$ is thus caused to rotate in unison with the flange $c^2$ thereby causing rotation of the concentric sleeve $d^2$ which carries the gear $d$. Rotation of gear $d$ say in clockwise direction causes rotation of the gear $d'$ say in counterclockwise rotation and similar rotation of the jack shaft $a$. Rotation of jack shaft $a$ in counterclockwise direction causes the rotation in counterclockwise direction of the gear $a'$ keyed thereon which in turn causes rotation, say in clockwise direction of the gear $b'$ and the shaft $b$ at a speed dependent upon the ratios of the gears $d$, $d'$ and $b$, $b'$. For different speeds of rotation of the propeller shaft $b$ different gear ratios are availed of as will be understood, the pair of gears offering the desired ratio being rendered effective in a similar manner. It is understood that only one clutch may be engaged at one time and this will be taken care of by the operating mechanism. It is thought from the foregoing description that the operation of the device will be apparent.

The present invention also contemplates the retardation or braking of the propeller shaft $b$ as a means of retarding the travel of the vehicle. This is accomplished by enclosing the gears in a housing $p$ which closely surrounds the gears as indicated in Figure 2. The housing is designed to serve as a lubricant reservoir so that the gears turn constantly in a bath of oil and due to the form taken by the housing each pair of meshing gears may serve as a fluid pump, drawing fluid from below and forcing it upwardly in the space $p'$ above the gears. Normally, the lubricant will be returned through the passages $p^2$ to the bottom of the reservoir. If it is desired to retard the rotation of the gears an obstruction may be placed in the passage $p^2$ so that the flow of lubricant is retarded and the back pressure will retard the rotation of the gearing. In the illustrated embodiment this obstruction may take the form of a valve $q$ having a passage $q'$ therein leading from the space $p'$ above the gears to the channel $p^2$ formed between housing $p$ and the walls of the transmission housing $h'$. Thus when valve $q$ is open no obstruction is afforded the flow of lubricant from above the gears through passage $p^2$ to the reservoir below the gears. By partly or entirely closing the valve $q$ this flow of fluid is obstructed and the rotation of the gears retarded as has been explained.

It will thus be seen that a transmission has been provided wherein there are no gears to shift. Instead therefore of throwing out the clutch, shifting the gear lever and letting the clutch in again as is usual in automobile practice it is merely necessary to shift one of the fingers L, M or N and the change of speed is effected with less effort and without the nerve racking clashing of gears and the attendant danger of stripped gears. By the present construction a gear case is enabled to be provided which is considerably shorter than that necessitated by the usual change speed gearing since there are no long spline shafts and in consequence the weight of the structure is materially reduced. This combination spoken of here as a transmission may take the place of fly wheel, clutch, transmission and rear wheel brakes, when applied to vehicles with separate front wheel brakes.

Various modifications may be made in the form and disposition of the co-operating elements going to make up the device as a whole without departing from the spirit of the invention. Obviously certain features of the invention may be availed of without regard to other features and reference is to be had to the appended claim for a delineation of the scope of the invention.

What I claim is:

In a transmission mechanism of the character described, the combination with a driving shaft, a driven shaft and a jack shaft, of a plurality of sleeves concentric with the driven shaft, a plurality of gears carried with the sleeves, respectively, a plurality of gears carried with the jack shaft and meshing, respectively, with the first named gears, a gear carried with the jack shaft, a gear carried with the driven shaft and meshing with the last named gear, a plurality of friction discs carried with the concentric sleeves, respectively, and a plurality of friction discs carried with the driving shaft, means to cause the selective frictional engagement of one of each of the said friction discs comprising a plurality of levers connected with said first named group of friction discs, respectively, a plurality of concentric sleeves carried with the driving shaft and operatively connected with said levers, and means to selectively move said last named concentric sleeves with respect to the driving shaft.

This specification signed this 19th day of March, A. D. 1926.

HENRY B. SHIELDS.